United States Patent [19]

Steighner

[11] Patent Number: 4,488,360
[45] Date of Patent: Dec. 18, 1984

[54] LATHE TOOL ALIGNING INSTRUMENT AND METHOD FOR ITS USE

[76] Inventor: Harry J. Steighner, 286 Three Degree Rd., Butler, Pa. 16001

[21] Appl. No.: 592,386

[22] Filed: Mar. 22, 1984

[51] Int. Cl.³ .............................................. G01B 13/19
[52] U.S. Cl. ................................ 33/185 R; 33/181 R; 33/371; 33/391
[58] Field of Search ............. 33/185 R, 181 R, 180 R, 33/174 Q, 365, 371, 333, 391, 379

[56] References Cited

U.S. PATENT DOCUMENTS

| | | | |
|---|---|---|---|
| 1,749,980 | 3/1930 | Loeser | 33/185 R |
| 2,472,241 | 6/1949 | Wilson | 33/185 R |
| 2,495,487 | 1/1950 | Germain | 33/371 |
| 2,667,703 | 2/1954 | Zumkeller | 33/185 R |
| 3,200,508 | 8/1965 | Harper | 33/181 R |
| 3,686,768 | 8/1972 | Humbert | 33/185 R |

FOREIGN PATENT DOCUMENTS 859556 12/1952 Fed. Rep. of Germany .... 33/185 R

Primary Examiner—Willis Little
Attorney, Agent, or Firm—George C. Atwell

[57] ABSTRACT

A hand-held instrument for aligning the point of a lathe cutting tool on the level of the longitudinal axis of a cylindrical work piece mounted for rotation in a lathe. The instrument comprises a shaft with a visually-ascertainable gauge, preferably in the form of a spirit level, fixedly secured to one end of the shaft, and a counterweight at the other end of the shaft. The instrument is adapted to be temporarily placed and lightly suspended by the pressure between the point of the carriage-mounted cutting tool and the cylindrical work piece, with the spirit level end of the instrument projecting upwardly whereby vertical adjustment of the cutting tool to the desired horizontal alignment with the work piece axis is accomplished when the spirit level indicates the shaft of the instrument is oriented at true vertical.

8 Claims, 8 Drawing Figures

LATHE TOOL ALIGNING INSTRUMENT AND METHOD FOR ITS USE

BACKGROUND OF THE INVENTION

In the machining art where it is common to mount a cylindrical work piece for rotation on a horizontal axis for external cutting of the work piece, it is common practice to align a carriage-mounted work-performing tool, such as a cutter, on a level coincidental with the longitudinal axis or center line of the work piece prior to initiating the cutting operation. Such alignment is necessary so that the cutting tool can be advanced gradually inwardly toward the work piece center line as the cutting operation progresses, in the horizontal plane of the work piece center line to thereby achieve the most efficient cutting operation. Because of the predetermined angular orientation of the point or cutting edge of the work-performing tool, misalignment of the tool during the cutting operation can result in inefficient cutting and/or damage or dulling of the tool's cutting edge.

The current practice of attaining appropriate cutting tool alignment relative to the work piece is an unnecessarily elaborate procedure which involves sliding the tool carriage, with the work-performing tool mounted thereon, to an end of the lathe bed where the tool cutting edge can be properly aligned with a predetermined stationary mark and then returning the carriage to the desired work-performing position for initiating the cutting operation.

SUMMARY OF THE INVENTION

The present invention comprehends an instrument for use by a lathe operator in quickly achieving proper adjustment and alignment between a work-performing tool, such as a cutting tool, and a cylindrical work piece mounted between centers on a lathe to thereby obviate the need for the operator to perform the time-consuming alignment procedure of the prior art heretofore described.

The instrument of the present invention is a relatively small unitary structure adapted for storage in the pocket of the operator. It comprises a rigid planar tang-like elongated shaft presenting oppositely disposed flat side surfaces. The shaft has a first end, for normal upward projection during use on which is integrally secured a visually readable gauge means. The gauge means is preferably in the form of a small spirit level, oriented at a right angle to the shaft. The other or second end of the shaft, which projects downwardly during use, terminates as an integral counterweight for effectively counter-balancing the gauge at the first end of the shaft.

The operator utilizes the instrument of tne present invention by placing it in a generally vertical orientation between the cutting edge of a carriage-mounted work-performing tool and the side surface of a cylindrical work piece mounted between lathe centers. The instrument is gripped and suspended between the tool edge and work piece, with the area of contact on the instrument being generally intermediate the ends of the instrument's shaft. The operator can ascertain the tilt of the instrument shaft away from true vertical by visual examination of the spirit level and thereby determine the direction of vertical adjustment of the cutting tool necessary to move the shaft of the instrument to true vertical which, when accomplished, indicates the tool cutting edge is in accurate horizontal alignment with the longitudinal axis of the work piece.

Other features and characteristics of the present invention will be apparent from the ensuing description of the accompanying drawings and the detailed description of the presently preferred embodiment of the invention shown in the drawings.

DETAILED DESCRIPTION OF THE PREFERRED EMBODIMENT

Figure 1:
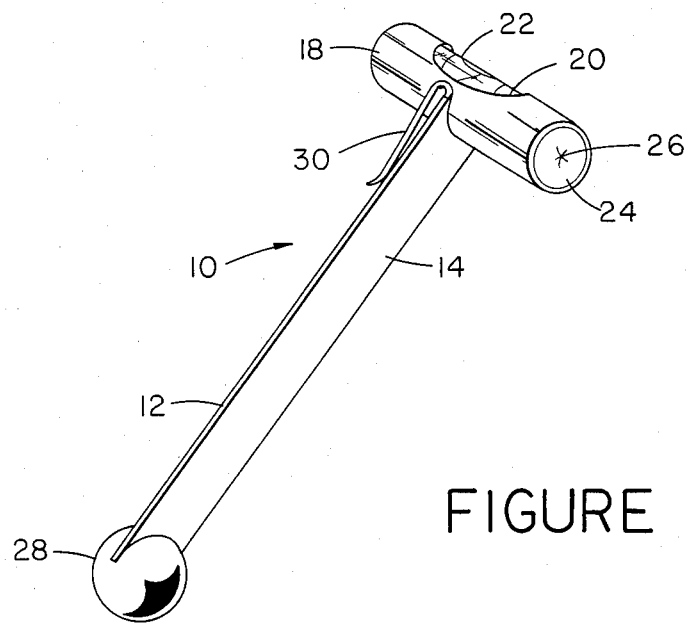
FIG. 1 is an isometric view of the presently preferred embodiment of the invention disclosed herein, shown in approximately ¾ths of full scale.
Figure 2:
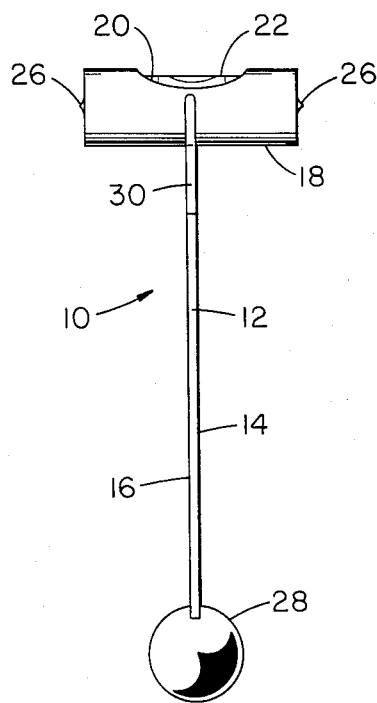
FIG. 2 is a side elevational view of the instrument first shown in FIG. 1.
Figure 3:
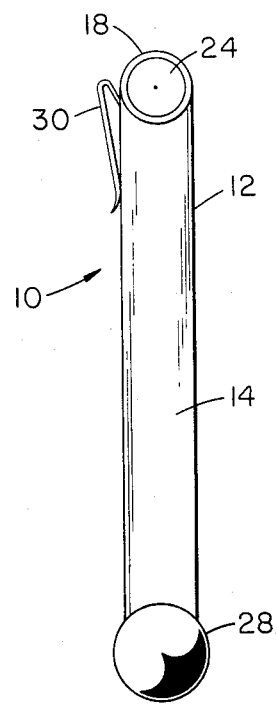
FIG. 3 is a side elevational view of the instrument shown in FIGS. 1 and 2, taken from the right side of the view shown in FIG. 2.

FIGS. 1, 2, and 3 illustrate the structure of the instrument of the present invention, denoted generally as instrument 10, which comprises a rigid planar elongated tang-like shaft 12 having oppositely disposed flat side surfaces 14 and 16. At the upper end of shaft 12, as shown in FIG. 1, is a tubular jacket or rigid sleeve 18 weldably secured to the shaft 12 at a point intermediate the sleeve 18. The sleeve 18 is oriented relative to the shaft 12 whereby the sleeve's axis is at 90° to the side surfaces 14 and 16 of the shaft 12. The sleeve 18 has an upwardly facing generally oval opening or window 20, revealing an internally carried transparent vial constituting a spirit level 22. Opposite ends of the sleeve 18 are closed by button-like end walls or discs 24 having respective outwardly-diverging center portions 26.

At the lower end of the shaft 12 is a sphere-shaped counterweight 28 appropriately slotted to be integrally secured to the shaft 12. The structure of the instrument 10 further includes a spring clip 30 fastened at its upper inwardly curved end to the edge of the shaft 12 and adjacent the point of connection of the shaft 12 to the sleeve 18. The spring clip 30 is not functional during use of the instrument, as hereafter described, but provides a means for clipping the instrument to the operator's pocket where the instrument may be stored when it is not in use.

Figure 4:
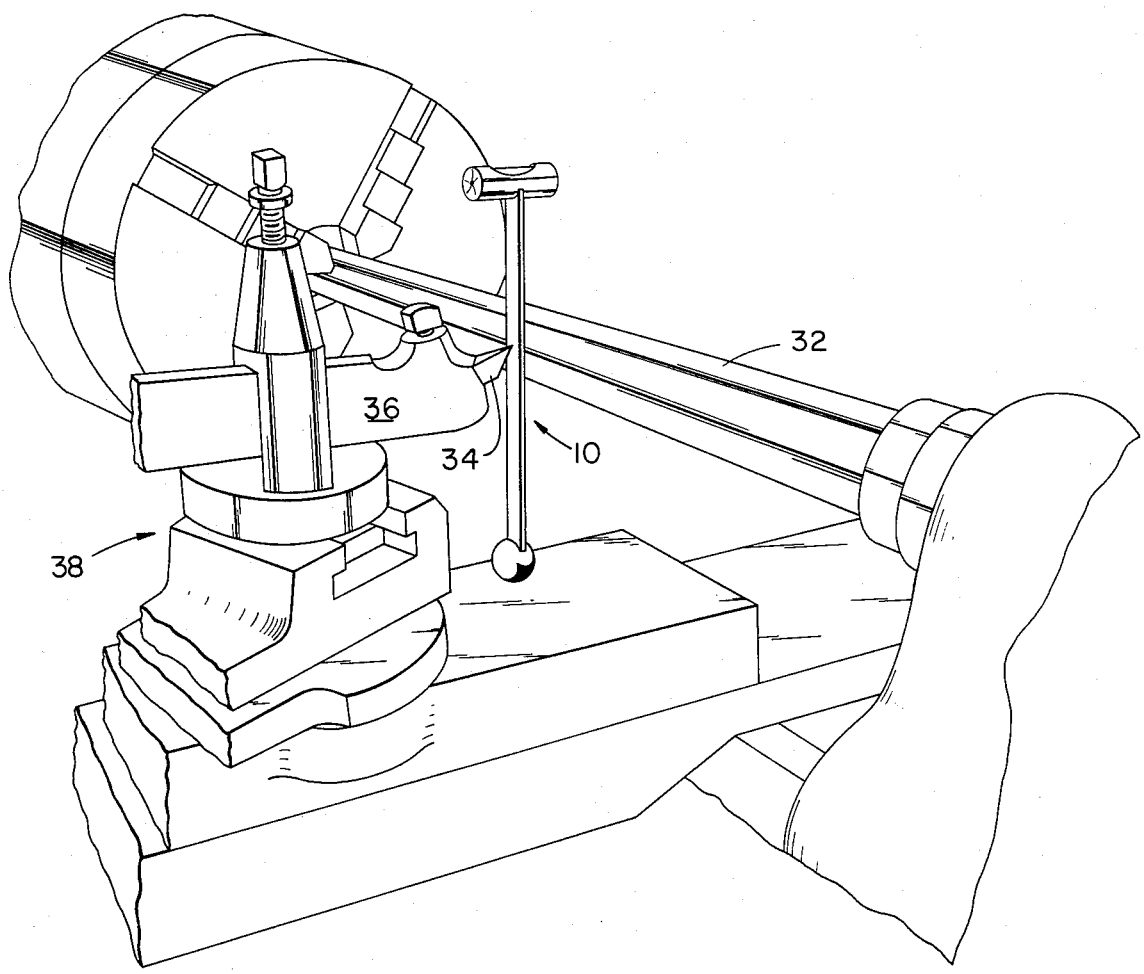
FIG. 4 is a view illustrating the disposition of the instrument of the present invention during actual use.

FIG. 4 illustrates the environment wherein the instrument 10 is employed, prior to performing an external cutting operation on a rotably-mounted cylindrical work piece 32, in aligning a work-performing tool 34 relative to the axis of the work piece 32. Specifically, the purpose is to locate the cutting edge of the work-performing tool 34 in horizontal level alignment with the longitudinal axis of the work piece 32. The lathe operator accomplishes this by first mounting the work piece 32 between lathe centers whereby the work piece is ready for driven rotation. The tool 34, carried in a holder 36, is fixed to a movable carriage assembly generally denoted as carriage 38. By manipulation of the carriage 38, the tool 34 is positioned whereby the tool point is spaced slightly from the outside surface of the work piece 32 and as nearly aligned to the level of the center line or axis of the work piece 32 as the operator can visually ascertain without accurate calibration. The operator then slips the instrument 10 into position, generally as shown in FIG. 4, and advances the cutter 34 toward the work piece 32 so the instrument 10 is lightly gripped therebetween and suspended in position.

Figure 5:
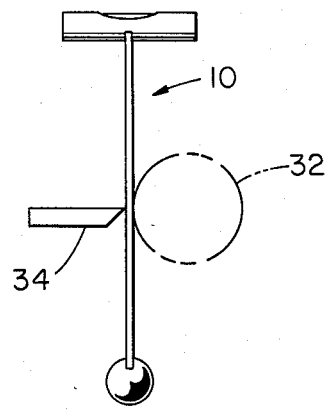
FIGS. 5, 6, and 7 are views further illustrating the use of the present invention and each showing the instrument of the present invention on a significantly reduced scale as compared to the various views of the instrument shown in FIGS. 1 through 3.
Figure 6:
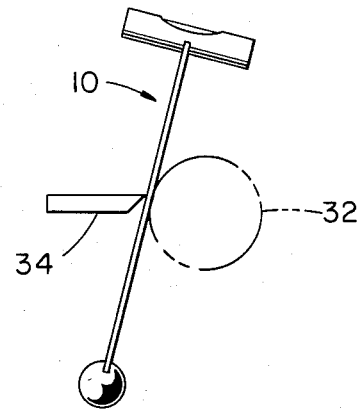
Figure 7:
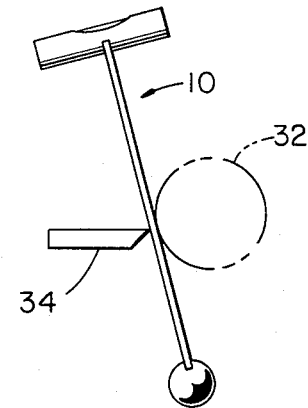

FIG. 5 illustrates the proper vertical orientation of the instrument 10 if the cutting edge of the tool 34 is properly aligned with the axis of the work piece 32 whereby a cutting operation on the work piece 32 can be initiated. It is more likely, however, that the instrument 10 will be in a tilted orientation when first placed into position by the operator. FIG. 6 illustrates the direction of tilt when the tool 34 is disposed with its cutting edge above the level of the axis of the work piece 32, and FIG. 7 illustrates the tilted orientation of the instrument 10 when the cutting edge of the tool 34 is below the level of the axis of the work piece 32. Accordingly, with the instrument 10 suspended generally in the position shown in FIG. 4, the operator adjusts the vertical position of the tool 34 upwardly or downwardly, as the situation may require, to bring the shaft 12 of the instrument 10 into true vertical orientation as shown in FIG. 5. The operator determines when the proper orientation of instrument 10 has been accomplished by visually observing the spirit level 22 through the window 20 provided in the sleeve 18.

Figure 8:
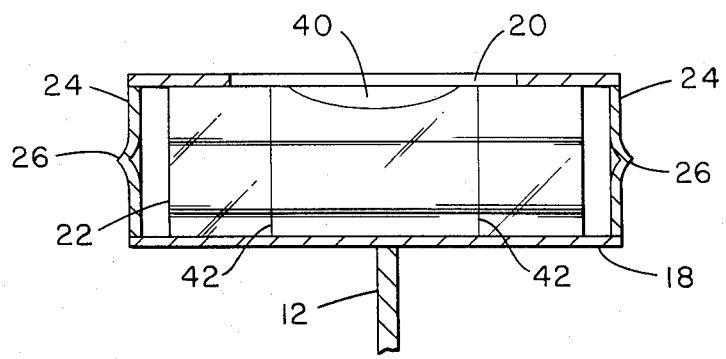
FIG. 8 is a fragmentary enlarged view of one end of the instrument of the present invention and having a portion thereof cut away to illustrate various structural components.

FIG. 8 illustrates the gauge means of the present invention in the form of the spirit level 22 contained within the sleeve 18. The spirit level 22 is a cylindrical transparent capsule or vial filled with sufficient fluid to provide a side surface bubble 40, the longitudinal position of which determines when it is properly oriented. Specifically, the bubble 40, by shifting the instrument 10 to seek true vertical positioning of the shaft 12, is caused to register between spaced apart annular centering lines 42 provided about the outer surface of the spirit level 22.

FIG. 8 also illustrates that the opposite ends of the sleeve 18 are closed by the discs 24, having integral outwardly projecting center portions 26 which serve as respective contact points for the hand of the operator in placing the instrument 10 into its operative position as shown generally in FIG. 4. The instrument 10 is thereby adapted to enable the operator to grasp the upper end of the instrument 10 between the index finger and thumb of one hand, which are respectively pressed against the oppositely facing center portions 26.

Although many dimensions of the instrument 10 could be varied or modified without detracting from its intended use as heretofore described, it has been found in practice that the ideal length of the shaft of the instrument 10, to enable its use with a wide range of different diameter work pieces, is approximately 4.5 inches, or at least within the range of 4.25 and 5.25 inches. In the preferred embodiment, the shaft 12 is constructed from a flat piece of tool steel measuring 1/16th inch thick, ½ inch wide and 4½ inches long. A first end of the shaft is arcuately cut to conform to the outside diameter of the sleeve 18, and the second or opposite end of the shaft 12 is either similarly arcuately shaped to conform to the outside surface of the spherical counterweight 28 or, alternatively, the counterweight 28 is appropriately slotted to receive the squared end of the shaft 12. Prior to affixing the sleeve 18 or the counterweight 28 to the shaft 12, the shaft is hardened to avoid penetration or marking of the shaft surface by the cutting tool which is to be aligned thereby. Any marring of the side surfaces 14 and 16 of the shaft 12 can eventually result in inaccuracy of alignment, particularly where the roughened surface may be placed in contact with the work piece.

The spirit level 22, commercially obtained, measured ⅜ths inch in diameter and is one inch long. It is a clear plastic closed cylinder all but filled with a liquid whereby the single surface bubble 40 is observable through the transparent side wall. The sleeve 18 may be constructed from round steel tubing having a ½ inch outside diameter and an inside diameter sufficient to snugly receive the level 22 therein. The window 20 is cut out of the sleeve 18 prior to the insertion of the level 22 within the sleeve 18, and the window is of sufficient size to enable viewing of the bubble 40 and observation of annular spaced apart centering lines 42 provided on the vial surface.

It is preferred that the counterweight 28 be a spherical steel ball which can be secured in position at the end of the shaft 12 by brazing or any other suitable attaching process. The actual size of the counterweight 28 is determined by the material used and the unitary weight of the gauging assembly at the other end of the shaft 12 which the counterweight 28 is intended to counterbalance.

The disks 24, as shown in FIG. 8, can be of plastic or any other suitable material, although, for the preferred embodiment, they are punched from a sheet of flat stainless steel stock and pressed and cemented into the opposite ends of the sleeve 18. In the punching operation to form the discs 24, the center point of the punch will also form the central outwardly protruding points 26 which serve as respective thumb and finger grips for the operator.

The optional spring steel pocket clip 30, shown in FIGS. 1 through 3, is preferably from spring steel wire and is attached to the edge of the shaft 12 immediately adjacent the connection of the shaft 12 to the sleeve 18, and is appropriately shaped with an outwardly extending free end to facilitate clipping of the instrument 10 to the operator's pocket.

Having heretofore described the various structural components of the instrument 10 and having illustrated in the accompanying drawings the manner in which the instrument 10 is used, the time savings and convenience afforded by the use of the instrument 10 should now be obvious. The operator wishing to align a cutting tool on a level with the axis of a mounted cylindrical work piece in a lathe simply grasps the instrument 10 by the thumb and forefinger of one hand gripping against the oppositely disposed disks 24. By this means, the shaft 12 is suspended in a generally vertical position and held against the work piece until the cutting edge of the carriage-mounted cutting tool is advanced against the shaft 12. The instrument 10 is held in suspension between the work piece and the point or cutting edge of the tool, and the operator observes the bubble 40 in the level 22. If the bubble 40 in the level 22 is off-center and oriented toward the work piece, the point of the cutting tool is below the level of the center line of the work piece, and the operator must adjust the cutting tool by moving it upwardly. If, however, the bubble 40 is off-center and oriented away from the work piece, the point of the cutting tool is above the level of the center line of the work piece, and the operator must adjust the cutting tool by moving it downwardly. When the bubble 40 is perfectly centered between the centering lines 42, as viewed through the window 20, the point of the cutting tool is in the desired alignment with the center line of the work piece.

While a certain presently preferred form of the instrument of the present invention has been heretofore described and shown, other equivalent variations may occur to those skilled in the art in the light of the above teachings. It should be understood that the appended claims are intended to cover all such variations coming within the spirit and scope of the present invention.

I claim:

1. An instrument for aligning a carriage-mounted work-performing tool with the longitudinal axis of a cylindrical work piece on a lathe, comprising:
   (a) a rigid planar elongated shaft having oppositely disposed flat side surfaces,
   (b) the shaft having a first end for normal upward projection during use and having gauge means integrally secured thereon for visually determining the relative orientation of the shaft to true vertical,
   (c) a second end of the shaft for normal downward projection during use, terminating in a fixed counterweight having a unitary weight substantially equivalent to the unitary weight of the gauge means.

2. The instrument of claim 1 wherein the length of the shaft is within the range of 4.25 and 5.25 inches.

3. The instrument of claim 1 wherein the gauge is a spirit level comprising a liquid-containing generally cylindrical transparent vial, and the vial axis is disposed ar a right angle to the length of the shaft.

4. The instrument of claim 3 wherein the vial is contained in a rigid jacket having a window to enable visual observation of a central side portion of the vial, and the jacket has opposite ends, each with an outwardly-projecting center portion, to facilitate manipulation of the instrument.

5. The instrument of claim 1 wherein the counterweight is a solid member having a slot in which the second end of the shaft is secured.

6. The instrument of claim 1 wherein at least the surface of the shaft, in the central portion thereof, is sufficiently hardened to resist surface scoring by the point of a cutting tool pressing thereagainst when the instrument is held in generally vertical suspension between a work piece and the tool point.

7. A method of aligning the point of a carriage-mounted cutting tool with the axial center line of a cylindrical work piece in a lathe, comprising the steps of:
   (1) attaching a leveling gauge means to one end of a rigid substantially short shaft;
   (2) placing the shaft between the point of a carriage-mounted cutting tool and the side surface of a cylindrical work piece mounted in a lathe whereby the leveling gauge means projects upwardly and the shaft is held in suspension between the point of the cutting tool and the work piece;
   (3) adjusting the height of the cutting tool point along the side surface of the shaft until the leveling gauge means indicates the shaft is oriented to true vertical.

8. The method of claim 7 comprising the further step of providing the downward end of the shaft with a counterweight.

* * * * *